(12) United States Patent
Mesa et al.

(10) Patent No.: US 6,512,591 B1
(45) Date of Patent: Jan. 28, 2003

(54) MULTIPLE PERIPHERAL SUPPORT FOR A SINGLE PHYSICAL PORT IN A HOST-BASED PRINTING SYSTEM

(75) Inventors: Christopher A. Mesa, Meridian, ID (US); Vincent J. Kenkel, San Leandro, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/800,604

(22) Filed: Feb. 19, 1997

(51) Int. Cl.[7] .............................................. G06F 13/00
(52) U.S. Cl. ........................... 358/1.15; 709/200; 713/1
(58) Field of Search ................................. 358/1.1, 1.15, 358/1.14, 1.12; 346/107.3, 134; 709/200, 247, 253; 399/361, 410; 713/1, 300, 340

(56) References Cited

U.S. PATENT DOCUMENTS 5,307,462 A * 4/1994 Hastings ..................... 395/828
5,392,433 A   2/1995 Hammersley et al. ... 364/230.3
5,732,198 A * 3/1998 Deppa et al. ............... 395/101

FOREIGN PATENT DOCUMENTS

EP       0726515 A2    8/1996

OTHER PUBLICATIONS

"OS/2 Warp Version 4 Certification Handbook", Oct. 1996, IBM, XP–002068316; p. 244, paragraph 1—p. 245, paragraph 7; figure 112.

* cited by examiner

Primary Examiner—Samir Ahmed
(74) Attorney, Agent, or Firm—Anthony J Baoa

(57) ABSTRACT

First an operating system, along with the host-based printing system, are initialized. The queue processor waits for the host-based printing system to issue a job open command. While waiting for a job open command, other applications may acquire and use the parallel port. Upon receiving a job open command, the queue processor informs the engine monitor to acquire the parallel port resource from the operating system. After the print job is done or canceled, the queue processor checks whether there are any additional print jobs than have been sent since the parallel port was acquired. After all print jobs are completed or canceled, the queue processor informs the engine monitor to release the parallel port resource to the operating system. Once the engine monitor has released the parallel port resource, the queue processor again waits for the next job open command.

9 Claims, 2 Drawing Sheets

MULTIPLE PERIPHERAL SUPPORT FOR A SINGLE PHYSICAL PORT IN A HOST-BASED PRINTING SYSTEM

FIELD OF THE INVENTION

This invention relates to printers, and more particularly, to a printing system that assumes complete control of the printer port.

BACKGROUND OF THE INVENTION

Presently there are two categories of printing systems, intelligent and dumb. The dumb category is the host based, or sleek, approach. The intelligent category differs in that it sends a mixture of rendered and non-rendered to the printer. It is similar to the concept of page description language (PDL) page printers like the Hewlett-Packard PCL page printers, in that the data sent across the I/O channel needs to be processed and rendered by the printer. A dumb printer only has to deal with placing an already rasterized image on paper, whereas the intelligent printer requires additional technology in the printer such as additional memory and processing power, to form the page for printing before starting the printing process.

Intelligent laser printers receive data to be printed from a host computer in the form of a control language over a standard interface. The control language data stream includes print function commands with interspersed print data. The laser printer responds by converting the received data stream into a list of simple commands, called display commands which describe what must be printed. The printer processes the display commands and renders the described objects into a raster bit map. This procedure generally requires a full page raster bit map memory, as the same memory is used for succeeding pages.

The use of control languages to enable data transfers between host computers and laser printers is widespread and must be accommodated on a commercial laser printer if that printer is to appeal to a large customer base. Such control language data is transferred to the laser printer over a standard, input/output (I/O) interface that exhibits a rather slow data transfer rate. Using that interface, a laser printer converts an incoming command language data stream into a "page intermediate" form (consisting of display commands) which is then converted to raster image data. The raster image data conversion process causes the intermediate page representation to be divided into a number of strips, with groups of the strips being sequentially processed to raster pixel data (video data for the print engine). The print engine is only started after an initial group of strips have been converted to raster pixel data. At this time the laser print engine prints the data and continues at a fixed speed, until all strips have been printed. If new rasterized data is not available at a rate that keeps up with the print engine's operation, a print "overrun" occurs and the page is not printable. As a result, considerable time is lost due to the substantial preprocessing which must occur before the print engine is started.

Some page printers employ a high speed page printing technique termed the "Sleek" mode or host based printing that avoids the substantial preprocessing that occurs when print data is transferred using a print control language. In the Sleek mode, the host computer converts user input data into a full raster pixel image and then feeds that raster image as pixel data, over an interface at a high data transfer rate. Certain prior art page printers employ a separate video port that accepts video raster image data at a multi-megabit per second rate. While such printers provide highly efficient print rates, the costs inherent in the separate video ports on both the printer and the host and circuitry for handling data over those ports adds substantially to the system's cost. Nevertheless, the Sleek mode may enable a substantial increase in print speed of a laser page printer.

The most popular sleek printing system for personal desktop computers allows complete host computer control over a printed page. In this sleek printing system, the host rasterizes all page data and sends page information and print control parameters to the page printer. By utilizing a high performance microprocessor on the host computer, the page image can be rasterized faster than letting the lower performance printer rasterize the image. Control of the printing process is provided by the host using logical channels over an IEEE 1284 compliant parallel port. Logical channels provide the means for page definition, page control and status gathering. Because the data transmission rates from the host computer being more "bursty" and sometimes slower than the video data transmission rate to the print engine, a elastic memory buffer must be provided within the printer for a functional sleek solution.

Once the host computer has rasterized the imaged, it transmits the data to the printer hardware. For transmission, the host obtains a "band" of data and transmits it to the printer. During transmission of a band of data, the host never selects another logical channel. Indeed the sleek printing system is dedicated to transmitting a band of data once transmission begins.

The WINDOWS printing system (WPS) ("WINDOWS" is a trademark of the Microsoft Corporation, Redmond, Washington) was designed to give the user valid printer status 100% of the time, even during idle time. Status may include messages indicating: the printer is out of paper, the toner cartridge is missing, etc. Ensuring this kind of status requires constant uninterrupted access to the I/O port. Uninterrupted access is generally accomplished by giving the sleek printing system ownership of the port while the printing system is "logically" connected to the printer. "Logically" connected to a port means that the sleek printing system is configured such that the printer driver's output is directed to that port.

Most operating systems allow multiple printers to be logically connected to the same port. This allows for the use of the same physical port to print to different printers by first changing the printer driver used to print an physically attaching the appropriate printer to that port. Such a scenario is common for a portable computer where the use has one type of printer at home and a different printer at work. If a sleek printing system has ownership of the port, thereby locking out another use of the port, the user must first change the logical port of the sleek printing system before the print driver can be changed.

If the host computer is running a sleek printing system, another device connected to the printer port, such as a scanner, tape drive, or camera are locked out from accessing the port until the sleek printing system is turned off.

Prior to the present invention, the sleek printing system locks the printer parallel port resource immediately after initialization. By locking down the parallel port, other printer drivers or parallel port peripherals, such as tape drives, scanners and dongles, are unable to use the parallel port.

SUMMARY OF THE INVENTION

In order to accomplish the present invention there is provided a method for sharing a port. First an operating system is started along with the host based printing system. A queue is polled waiting for a job open command from the host based printing system. Once queue receives the job open command, the port is acquired from the operating system. The task as defined by the job open command is performed. The queue is checked for any additional commands. If the queue contains additional tasks, they are executed. In the alternative where the queue is empty the monitor releases the port to the operating system.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

Figure 1:
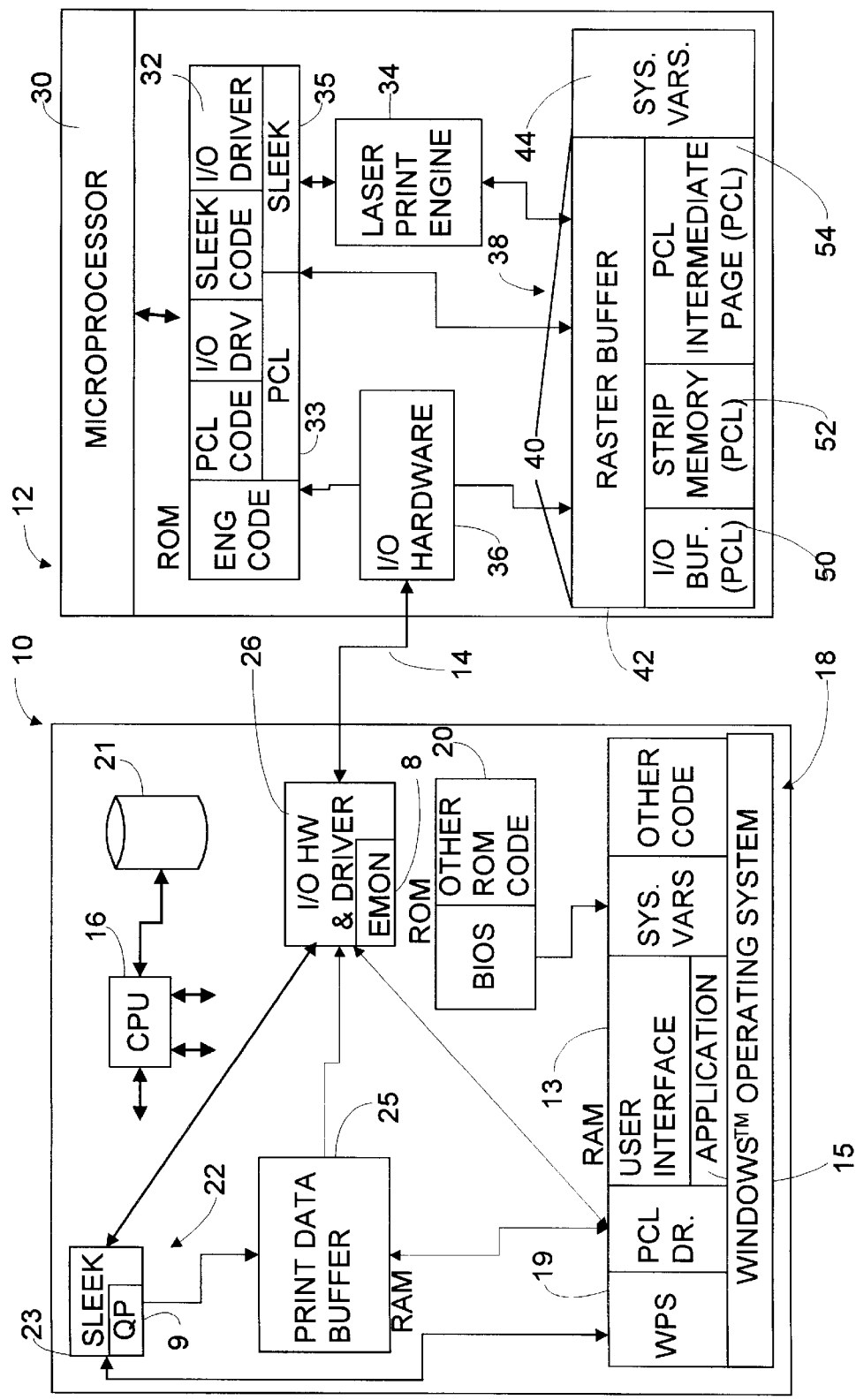
FIG. 1 is a block diagram showing internal aspects of both a host computer and an attached page printer, the host computer and page printer being connected over a standard I/O interface.

The present invention is not limited to a specific embodiment illustrated herein. Referring particularly to FIG. 1, a host computer 10 is connected to a printer 12 via a standard I/O connection 14. For the purposes of this description, it will be assumed that host computer 10 is a personal computer and that printer 12 is a laser printer. It will be further assumed that host computer 10 is connected to printer 12 via an I/O connection 14 that enables burst data transfers at a rate of approximately 2,000,000 bytes per second and a sustained rate of about 500,000 bytes per second. I/O connection may be a cable, infrared, network logical connection or the equivalent.

Host computer 10 includes a central processing unit 16 and a random access memory (RAM) that is segmented into a number of portions. RAM portion 18 contains software code for controlling the host computer's application, printer driver functions, and a user interface. RAM portion 18 also includes system variables, the "WINDOWS" operating system and a Windows printing system (WPS) driver 19. A read only memory (ROM) 20 includes firmware for controlling the basic input/output system (BIOS) and code for controlling other host functions. RAM portion 22 includes sleek driver software 23 for enabling host computer 10 to operate in Sleek mode. A further portion 25 of RAM is set aside to act as a buffer to contain raster image data that has been formatted by Sleek driver 23 and is ready for transfer to printer 12 via I/O hardware and driver module 26.

Within printer 12, a microprocessor 30 controls the overall functioning of the printer and its sub-components. A read only memory (ROM) 32 contains firmware code for controlling print engine 34 in both a PCL mode 33 and a Sleek mode 35. PCL mode 33 firmware enables received PCL-configured code to be converted to a page intermediate form and then formed into a raster configuration for printing by print engine 34. The I/O driver portion of PCL mode 33 controls I/O hardware module 36 to properly respond to received PCL commands and data.

Sleek mode firmware 35 is a bit map control code and includes a Sleek code section that allocates a portion of RAM 38 as an I/O buffer 40, and an I/O driver control section. I/O buffer 40 serves either as a raster image buffer 42 or as a control language/data buffer 50, 52, 54. When I/O buffer 40 is configured as a raster image buffer 42, it receives raster-formatted data from I/O hardware 36 and stores it temporarily, prior to feeding it to print engine 34. Otherwise, I/O buffer 40 is configured to include portions 50, 52, and 54 for use when receiving PCL data from host computer 10.

As described above, when host computer 10 and printer 12 are operating in sleek mode, the WPS 19 is given ownership through the sleek driver 23 of the I/O port 26. Because the WPS 19 has ownership of the I/O port 26, no other applications 15 can gain access to the port. For example, if the user loads a tape backup application that attempts to access a tape drive connected to I/O port 26, WPS 19 will not release the I/O port 26.

Figure 2:
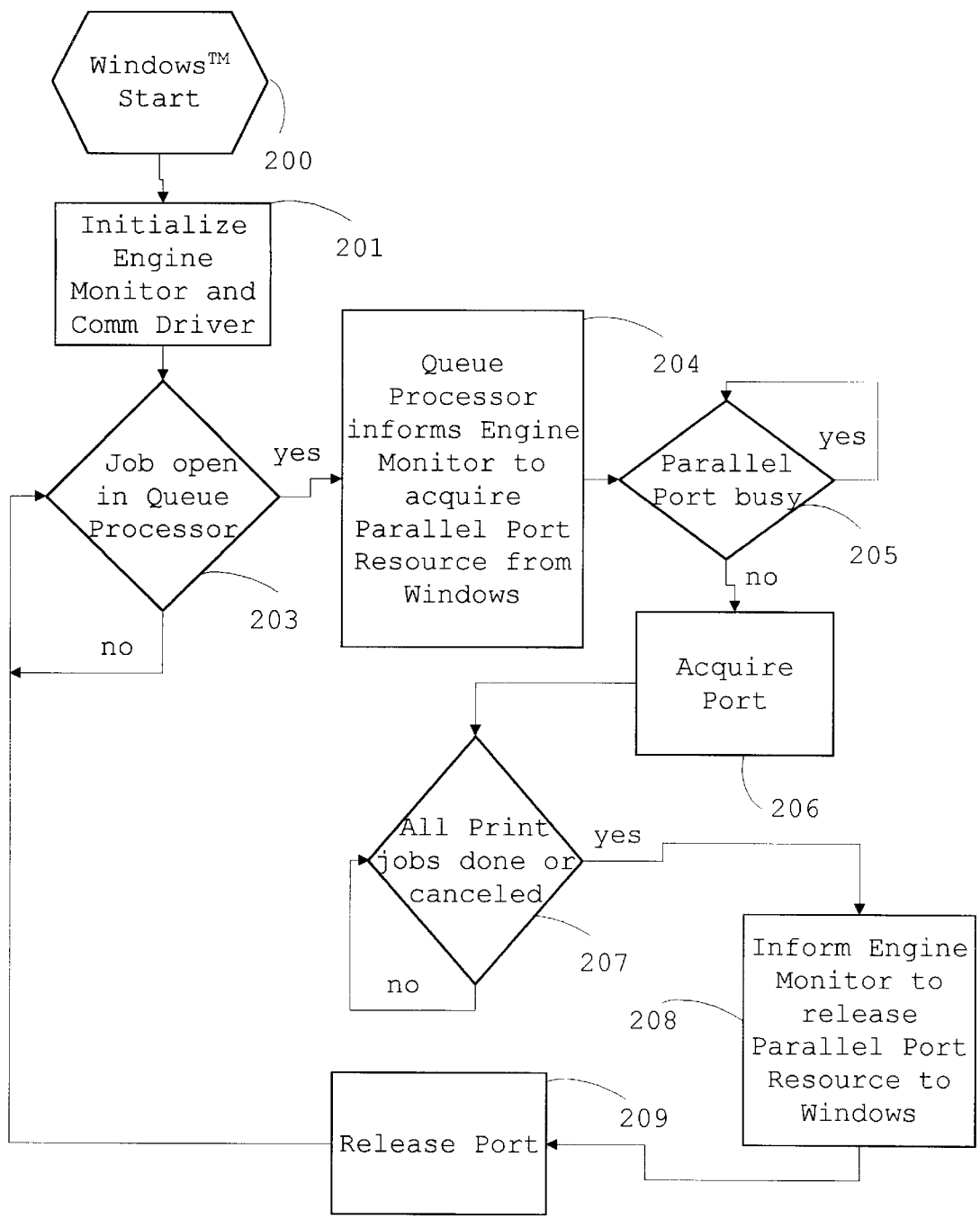
FIG. 2 is a flow diagram showing the logical operation of the preferred embodiment of the present invention.

Referring now to FIG. 2 where a flow chart showing the preferred embodiment of the present invention is shown. As the Windows operating system starts 200, the WPS 19 is started if a WPS printer is configured. During initialization of the WPS 19, the sleek driver 23 is also initialized 201, however, the I/O port 26 is not given to the WPS. The sleek driver 23 includes, among other things, a queue processor (QP 9) and an engine monitor (EMON 8).

Once these processes are initialized, QP 9 waits 203 for the WPS 19 to issue a job open command. While the QP 9 is waiting for a job open command, other applications may acquire and use the parallel port. Upon receiving a job open command, QP 9 informs 204 EMON 8 to acquire the parallel port resource from Windows. EMON 8 waits until the parallel port is not busy 205 and then acquires the port 206. Assuming that the parallel port was not busy, EMON 8 will generally acquire the parallel port before WPS 19 has completed preparing the print job. After the print job is done or canceled, QP 9 checks whether there are any additional print jobs than have been sent since the parallel port was acquired 207. After all print jobs are completed or canceled, QP 9 informs 208 EMON 8 to release the parallel port resource to Windows. Once EMON 8 has released the parallel port resource 209, the QP 9 waits 203 for the next job open command. As stated above, while QP 9 is waiting for a job open command, the parallel port resource may be acquired by another application.

Thus, by identifying when the WPS needs the parallel port and only acquiring at that time, contention problems are eliminated. One drawback to not having the port already acquired, is that there is a performance penalty to acquire and negotiate the port. This problem is addressed by having the Queue Processor (QP) notify the Engine Monitor (EMON) to acquire the port as soon as a job open command is received. Thus, the port will be acquired before the job is actually ready to print.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for sharing a port on a host computer, said method comprising the steps of:

first starting an operating system;

second starting a host based printing system;

polling a queue for a job open command from said host based printing system;

after said step of polling receives said job open command, acquiring said port from said operating system;

performing a task as defined by said job open command; and releasing said port to said operating system.

2. The method of claim 1 wherein said step of second starting comprising the steps of:
   initializing an engine monitor; and
   initializing an I/O hardware and driver.

3. The method of claim 2 comprising the step of:
   said queue notifying said engine monitor when said step polling receives said job open command.

4. The method of claim 2 further comprising the steps of:
   executing all tasks entered into said queue before performing said step of releasing said port; and
   informing said engine monitor to release said port to said operating system.

5. A method for sharing a port on a host computer, said method comprising the steps of:
   first starting an operating system;
   second starting a host based printing system;
   polling a queue for a job open command from said host based printing system;
   after said step of polling receives said job open command, acquiring said port from said operating system;
   performing a task as defined by said job open command;
   checking if said queue contains additional commands; and
   if said queue contains additional tasks, executing said additional tasks, in the alternative where said queue is empty releasing said port to said operating system.

6. The method of claim 5 wherein said step of second starting comprising the steps of:
   initializing an engine monitor; and
   initializing an I/O hardware and driver.

7. The method of claim 6 comprising the step of:
   said queue notifying said engine monitor when said step polling receives said job open command.

8. A computer system that allow sharing of a port, said computer system comprising:
   an operating system;
   a host-based printing system in communication with said operating system, said host-based printing system comprising;
   a queue processor; and
   an engine monitor in communication with said queue processor and said operating system;
   said queue processor instructing said engine monitor to acquire said port from said operating system when said host-based printing system issues a job open command; and
   said queue processor instructing said engine monitor to release said port to said operating system when said host-based printing system completes all tasks associated with said job open command.

9. The system of claim 8 wherein said queue processor performing additional command received from said host-based printing system before instructing said engine monitor to release said port to said operating system.

* * * * *